United States Patent
Dubin et al.

(10) Patent No.: US 6,769,777 B1
(45) Date of Patent: Aug. 3, 2004

(54) MULTI-APERTURE OPTICAL DIMMING SYSTEM

(75) Inventors: Matthew B. Dubin, Scottsdale, AZ (US); Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/645,081

(22) Filed: Aug. 20, 2003

(51) Int. Cl.[7] .............................................. G03B 21/14
(52) U.S. Cl. ........................ 353/97; 353/38; 359/233; 359/889
(58) Field of Search ................. 353/38, 97; 359/232, 359/233, 738, 739, 740, 889; 362/293, 321

(56) References Cited

U.S. PATENT DOCUMENTS

| | | | | |
|---|---|---|---|---|
| 3,594,497 A | * | 7/1971 | Graser, Jr. ................. 348/104 |
| 5,098,184 A | | 3/1992 | van den Brandt et al. | |
| 5,300,967 A | * | 4/1994 | Kamon ...................... 353/97 |
| 5,924,783 A | * | 7/1999 | Jones ......................... 353/97 |
| 6,154,320 A | * | 11/2000 | Itoh et al. ................... 359/629 |
| 6,257,726 B1 | | 7/2001 | Okuyama | |
| 2002/0105621 A1 | * | 8/2002 | Kurematsu ................. 353/30 |
| 2002/0109992 A1 | * | 8/2002 | Wang ........................ 362/293 |

* cited by examiner

Primary Examiner—William C. Dowling

(57) ABSTRACT

A dimming system is provided that facilitates a wide dimming range and precise control of the dimming range. In one embodiment, the dimming system comprises a multi-aperture dimming system. The multi-aperture dimming system can be implemented in any display that utilizes a fly's eye lens array. The multi-aperture dimming system comprises a plurality of moveable attenuators. The moveable attenuators are configured to form a plurality of apertures that can be controllably opened and closed. Each of the plurality of apertures attenuates a portion of the light propagating through at least one of the lenses in the fly's eye lens array. Thus, by selectively controlling the plurality of moveable attenuators, the dimming system can control the throughput of light propagating through the fly's eye lens array, where the throughput is the percentage of light passed compared to the light passed at maximum brightness and thus is the reciprocal of the dimming ratio at a given setting.

35 Claims, 13 Drawing Sheets

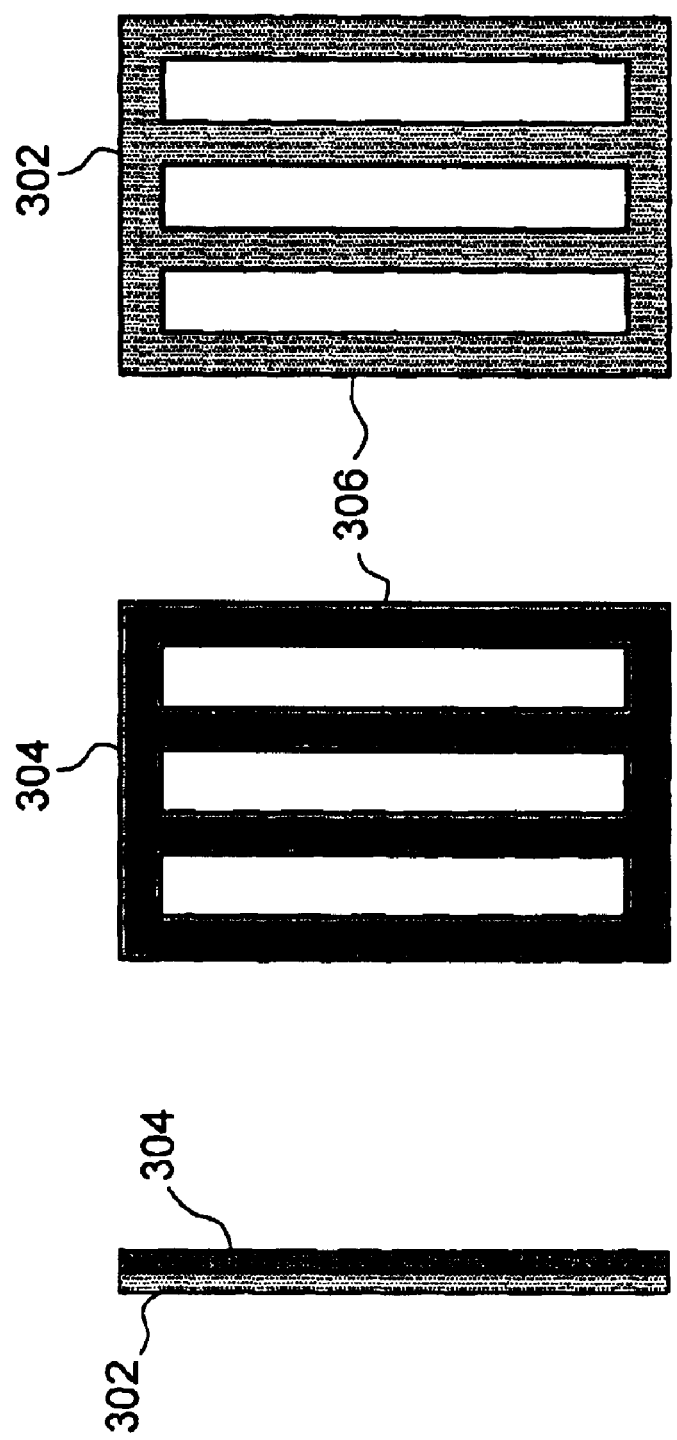

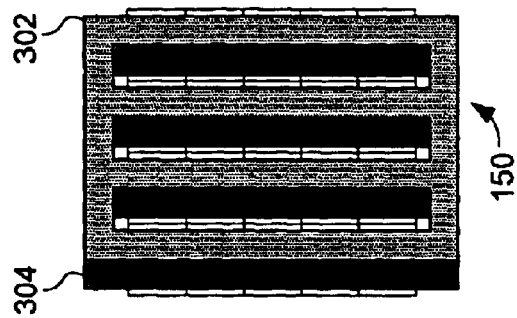
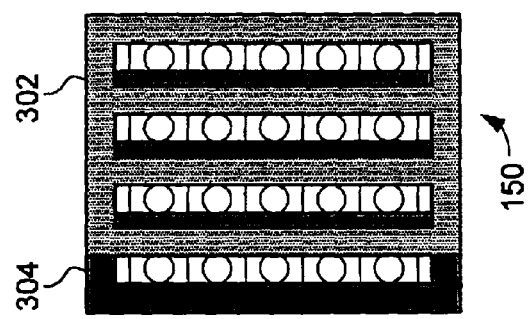
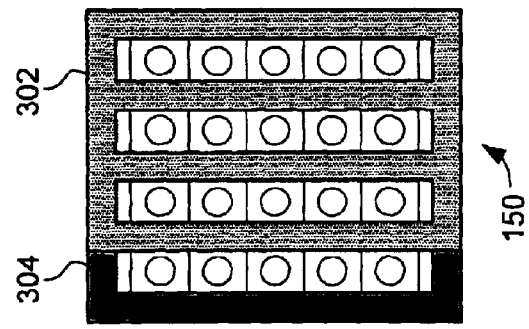
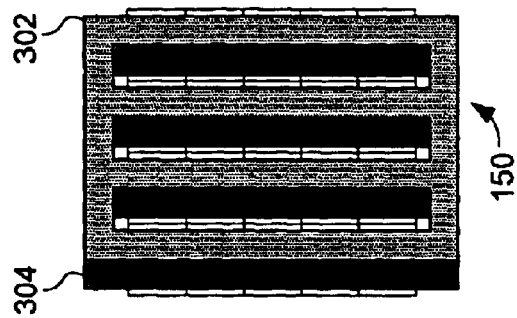

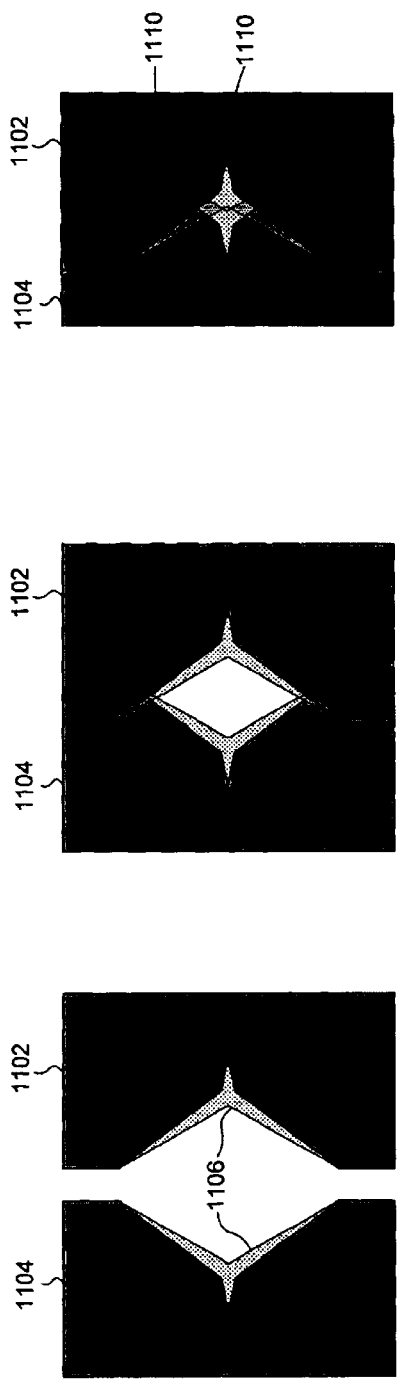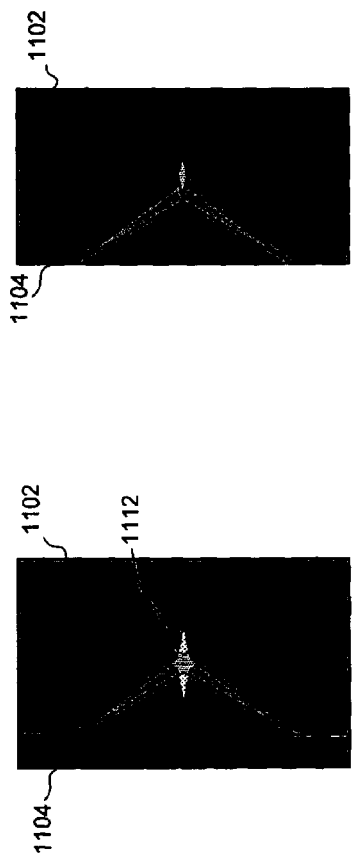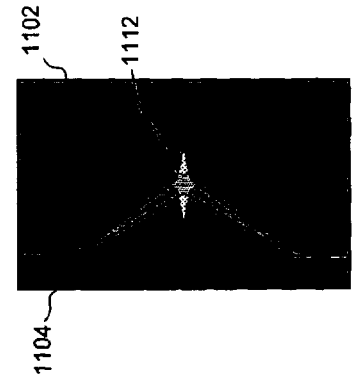
FIG. 11A  FIG. 11B  FIG. 11C  FIG. 11D  FIG. 11E

MULTI-APERTURE OPTICAL DIMMING SYSTEM

FIELD OF THE INVENTION

This invention generally relates to projection displays, and more specifically applies to dimming in projection displays.

BACKGROUND OF THE INVENTION

Various types of optical displays are commonly used in a wide variety of applications. Included among these various types of displays are projection displays. Projection displays typically involve optical relaying of the displayed image prior to viewing. A typical projection display system will often include a diffuse viewing screen. One of the attractive characteristics of many projection displays is the flexibility of configuring a system with the particular features needed for a specific application.

One important performance parameter in certain projection displays is the range of luminance that can be provided by a projection display, commonly referred to as the dimming range. In many applications it is critical that a display make information clearly visible in a wide variety of ambient light conditions. For example, a display used in an avionics control system will need to display information to the pilot under lighting conditions that can range from near total blackness to the extreme glare created by facing directly into daytime sunlight. Such a display must have a high maximum dimming ratio, where the dimming ratio is the ratio of the display luminance at highest brightness to the display luminance at its current setting. Without a sufficiently high maximum dimming ratio, a viewer of the display may be unable to easily read information from the display in high ambient light conditions, low ambient light conditions, or both. In some applications, the required maximum dimming ratio may be as little as 100:1. In other applications, a maximum dimming ratio of 20,000:1 or greater may be required to effectively display information in its expected range of ambient conditions. It should also be noted that in some applications alternative measures of light output may be used rather than luminance. In these cases, the dimming ratio can be expressed with respect to that measure. One such example might be the amount of optical power within a certain wavelength band.

Additionally, in some applications the ability to precisely control the amount of dimming is of particular importance. This is typically of greatest concern in low light conditions, where small changes in the amount of dimming can have significant effects on the viewability of the display. Unfortunately, many prior dimming solutions have been unable to provide the precise dimming control needed for many critical applications.

Thus, in many applications the projection display must be able to accurately and clearly display information through a wide dimming range, with the ability to precisely control the amount of dimming. Unfortunately, prior art solutions to dimming in projection displays have met with limited success. As mentioned above, some prior art solutions have been unable to reliably achieve the wide dimming range or the precise dimming control needed for certain critical applications. Other prior art solutions have required excessively complex structures that require large amounts of space and suffered from high cost and low reliability. Some prior art solutions have also negatively impacted the high bright state luminance required for bright ambient conditions.

Thus, what is needed is an improved dimming system that provides a wide dimming range and precise control over the amount of dimming in a projection display.

BRIEF SUMMARY OF THE INVENTION

The present invention provides a dimming system that facilitates a wide dimming range and precise control of the dimming range. In one embodiment, the dimming system comprises a multi-aperture dimming system. The multi-aperture dimming system can be implemented in any display that utilizes a fly's eye lens array. The multi-aperture dimming system comprises a plurality of moveable attenuators. The moveable attenuators are configured to form a plurality of apertures that can be controllably opened and closed. Each of the plurality of apertures attenuates a portion of the light propagating through at least one of the lenses in the fly's eye lens array. Thus, by selectively controlling the plurality of moveable attenuators, the dimming system can control the throughput of light propagating through the fly's eye lens array, where the throughput is the percentage of light passed compared to the light passed at maximum brightness and thus is the reciprocal of the dimming ratio at a given setting.

The moveable attenuators are preferably configured to allow substantially all light transmission through each lens in the fly's eye lens array when the moveable attenuators are moved to open the plurality of apertures. Likewise, the plurality of moveable attenuators are preferably configured to block substantially all light through each lens in the fly's eye lens array when moved to close the plurality of apertures. Thus, the dimming system can provide a wide range of throughputs and dimming ratios.

In a further variation on this embodiment, the moveable attenuators each have an attenuation profile at the area forming each of the plurality of apertures to increase the control over the dimming system at low light transmission levels The attenuation profile increases the dimming control by increasing the ratio of moveable attenuator movement to the corresponding change in throughput at low light transmission levels where the apertures are small and the dimming ratio is high This improves dimming control by making throughput change less sensitive to attenuator movement at these low light levels. In addition, the attenuation profile can be implemented to provide a plurality of sequential dimming modes, where each dimming mode provides a different ratio of attenuator movement to throughput change.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 3 is a schematic view of a dimming device;

FIG. 4 is a schematic view of a dimming device at various dimming levels;

FIG. 11 is a schematic view of another embodiment moveable attenuators at various dimming levels;

DETAILED DESCRIPTION OF THE INVENTION

Figure 1:
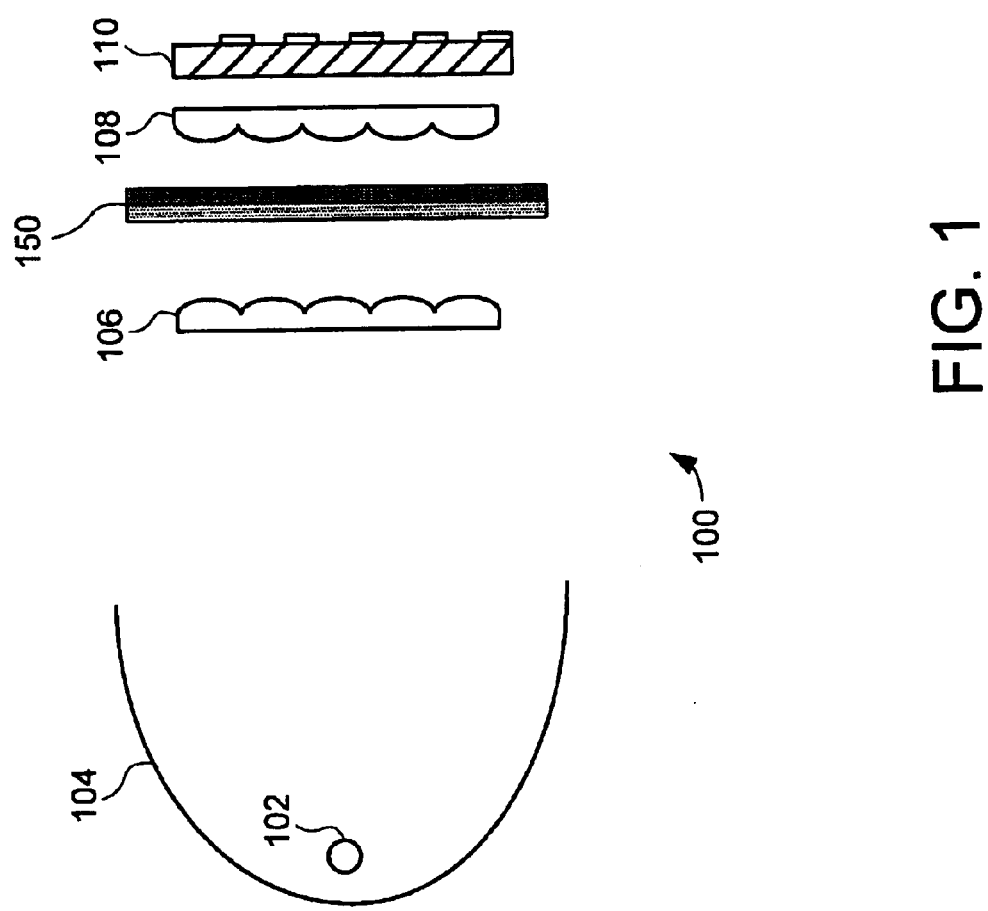
FIG. 1 is a cross-sectional view of a fly's eye lens array with a dimming device.

The present invention provides a dimming system that facilitates a wide dimming range and precise control of the dimming range. In one embodiment, the dimming system comprises a multi-aperture dimming system. The multi-aperture dimming system can be implemented in any display that utilizes a fly's eye lens array. The multi-aperture dimming system comprises a plurality of moveable attenuators. The moveable attenuators are configured to form a plurality of apertures that can be controllably opened and closed. Each of the plurality of apertures attenuates a portion of the light propagating through at least one of the lenses in the fly's eye lens array. Thus, by selectively controlling the plurality of moveable attenuators, the dimming system can control the throughput of light propagating through the fly's eye lens array, where the throughput is the percentage of light passed compared to the light passed at maximum brightness and thus is the reciprocal of the dimming ratio at a given setting.

The moveable attenuators are preferably configured to allow substantially all light transmission through each lens in the fly's eye lens array when the moveable attenuators are moved to open the plurality of apertures. Likewise, the plurality of moveable attenuators are preferably configured to block substantially all light through each lens in the fly's eye lens array when moved to close the plurality of apertures. Thus, the dimming system can provide a wide range of throughputs and dimming ratios.

In a further variation on this embodiment, the moveable attenuators each have an attenuation profile at the area forming each of the plurality of apertures to increase the control over the dimming system at low light transmission levels. The attenuation profile increases the dimming control by increasing the ratio of moveable attenuator movement to the corresponding change in throughput at low light transmission levels where the apertures are small and the dimming ratio is high. This improves dimming control by making throughput change less sensitive to attenuator movement at these low light levels. In addition, the attenuation profile can be implemented to provide a plurality of sequential dimming modes, where each dimming mode provides a different ratio of attenuator movement to throughput change. This throughput is preferably achieved by area modulation of the distributed plurality of apertures, weighted by the transmittance and illumination profiles within those apertures.

In another embodiment, the dimming system comprises at least one moveable attenuator, with the attenuator movable to open and close an aperture and control the amount of light transmitted through the aperture. The moveable attenuator includes an attenuation profile selected to increase the control over the dimming system at low light transmission levels. The attenuation profile increases the dimming control by increasing the ratio of moveable attenuator movement to the corresponding change in throughput at low light transmission levels. This increases dimming control by making throughput less sensitive to attenuator movement at these low light levels. Additionally, the edge shape can include complex shapes and/or partial attenuator structures (e.g., filters) to create multiple different levels of sensitivity at different levels of throughput.

Turning now to FIG. 1, a schematic view of a fly's eye homogenizer 100 and a multi-aperture dimmer 150 are illustrated. A fly's eye homogenizer is a type of lens array used to create a uniform and efficient illuminator in projection systems. They are also commonly used with polarization converter elements to increase the efficiency of the projector. The fly's eye homogenizer 100 is exemplary of the type of fly's eye lens arrays that can be used with a multi-aperture dimmer of the present invention, but other fly's eye configurations could be used, such as arrays of cylindrical lenses, diffractive lenses, prismatic lenses or focusing lenses based on total internal reflection. Other structures having the functionality of lens arrays could be used, such as arrays of tapered light guides having focusing functionality based on total internal reflection. Additionally, not all the elements illustrated in FIG. 1 would necessarily be included in all implementations. Finally, some implementations would include additional elements not illustrated in FIG. 1. For example, U.S. patent application Ser. No. 6,257,726 illustrates and describes a more complex fly's eye homogenizer that can be implemented with a multi-aperture dimmer of the present invention.

The fly's eye homogenizer 100 includes a light source 102, a reflector 104, a first lens array 106, a second lens array 108. The light source 102 provides source of light for the system, the reflector 104 reflects the light from the source and converts it to a substantially parallel beam in the direction of the first lens array 106. The first lens array 106 includes a plurality of positive convex lenses that divide the light into an array of smaller light beams directed toward the second lens array 108. Each of the smaller light beams is focused to pass through one of the lenses in the second lens array 108. The smaller light beams pass through the multi-aperture dimmer 150 on the way to the second lens array 108.

Multi-aperture dimmer 150 is preferably located close to second lens array 108, such that the smaller light beams are well separated from each other in the vicinity of the multi-aperture dimmer 150. This separation between smaller light beams allows multi-aperture dimmer 150 to be positioned out of the way of the smaller light beams when fly's eye homogenizer 100 is adjusted for maximum light output. In this way, the insertion loss associated with the dimming mechanism is minimized. Insertion loss in this context is defined as the fraction of light lost from the brightest state due to incorporation of the dimmer. Preferably, the incorporation of the multi-aperture dimmer results in little or no insertion loss.

In the embodiment of FIG. 1, the light leaving second lens array 108 of fly's eye homogenizer 100 enters an array of polarization converter elements 110. Specifically, the array of polarization converter elements 110 is positioned sufficiently close to the second lens array 108 such that each of the smaller light beams focused by first lens array 106 remains focused as it enters one of the polarization converter elements 110. The polarization converter elements 110 separate the smaller light beams into different orthogonal polarizations (e.g., S-polarized light and P-polarized light). This can be accomplished with a polarization separating surface for each polarization converter element that reflects one light polarization and transmits the other. The reflected state is then reflected again along the optical axis and transmitted through a half-wavelength retardation plate, typically affixed to the exit surface of the array of polarization converter elements 110. This results in nearly all the light exiting each polarization converter element with the same polarization. The resulting plurality of polarized light beams can then be recombined and used in an image display. It should be noted that not all fly's eye homogenizer applications utilize polarization converter elements and that these elements would not be present in certain applications. For example, polarization conversion would typically not be used unless the illumination system is intended for use with a polarized light modulator such as an Active Matrix Liquid Crystal Display (AMLCD) light valve. Other variations on this embodiment are also possible. Other light sources and reflectors can be used.

It is generally desirable that the multi-aperture dimmer 150 be positioned proximate to the first lens array 106 and with a relative spacing between multi-aperture dimmer 150 and the first lens array 106 which minimizes insertion loss associated with the dimmer. The first lens array 106 facilitates separation of the passing light into a plurality of light beams having spatial separation. The multi-aperture dimmer 150 is preferably positioned such that the slats in the dimmer can be moved to between the light beams, thus minimizing insertion loss associated by the dimmer when in the bright state. It should also be noted that while FIG. 1 illustrates the multi-aperture dimmer 150 between the first lens array 106 and the second lens array 108, that different applications may have different configurations, and that it is generally sufficient for the multi-aperture dimmer 150 to be proximate one or both of the lens arrays. For example, in certain implementations, multi-aperture dimmer 150 may be on the other side of second lens array 108. In other implementations, additional optical elements (e.g. filters) may be between the multi-aperture dimmer 150 and a lens array. In all these cases, the multi-aperture dimmer 150 is proximate a lens array and serves to control light throughput through the display. As a further example of a different implementation, both second lens array 108 and array of polarization converter elements 110 may be omitted without impacting the multi-aperture dimming aspect of the embodiment.

Figure 2:
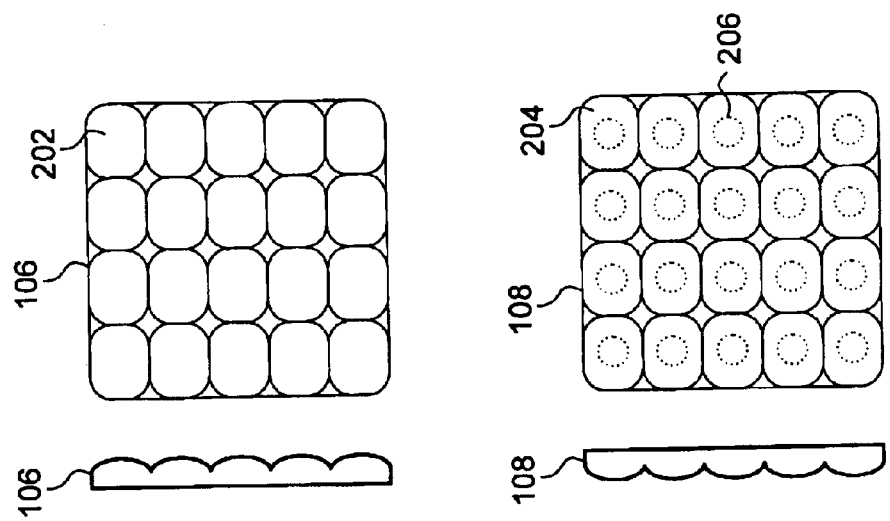
FIG. 2 are schematic views of fly's eye lens arrays.

Turning now to FIG. 2, a side and front view of the first lens array 106 and the second lens array 108 is illustrated. As illustrated in FIG. 1, the first lens array 106 includes a plurality of lenses 202, with each lens 202 configured to focus a light beam onto one of the lenses in the second lens array 108. Likewise, the second lens array 108 includes a plurality of lenses 204. In FIG. 2, the location of the light beams on the second lens array 108 (as focused by the first lens array 106) is illustrated by the plurality of dashed circles 206. As can be seen in FIG. 2, the first lens array 106 focuses the light into a plurality of smaller beams, with each of those plurality of smaller beams being focused on one lens 204 in the second lens array 108.

It should be noted that each lens in the first lens array 106 is generally selected to have a similar aspect ratio to the light valve that is being illuminated.

It is important to note that in most fly's eye homogenizers, each of the plurality of smaller beams is spatially separated where they intersect the second lens array 108, with some distance between them. In many applications the light beams will have a duty cycle of less than 50%. As will become clear, the moveable attenuators of the multi-aperture dimmer will be placed between the areas where the smaller beams hit the second lens array 108. This allows the moveable attenuators to be out of the way of the smaller beams when in high brightness mode, thus facilitating low insertion loss and allowing almost full light transmission. When dimming is desired, the moveable attenuators can be moved from between beams to where they block a portion of the beams, and thus dimming of the light transmitted through the fly's eye homogenizer is achieved.

Turning now to FIG. 3, a first embodiment of a multi-aperture dimmer 150 is illustrated. The multi-aperture dimmer 150 comprises a first set of moveable attenuators 302 and a second set of moveable attenuators 304. FIG. 3 illustrates a side view of the moveable attenuators 302 and 304 together and separate front views of the moveable attenuators 302 and 304. The moveable attenuators 302 and 304 each comprise several vertical slats 306. The slats are configured with a dimension and spacing such that they can be placed between the light beams in the fly's eye homogenizer. This allows the movable attenuators 302 and 304 to be moved out of the way of the light beams for full light transmission. When dimming is required, the moveable attenuators can be moved to partially or completely block the light beams.

Turning now to FIGS. 4A, 4B, 4C and 4D, the multi-aperture dimmer 150 is illustrated at several different dimming configuration levels. FIGS. 4A–4D illustrate the multi-aperture dimmer 150 adjacent a second lens array, with circles illustrating the location of the plurality of light beams as formed by the first lens array (as was illustrated in FIG. 2).

Specifically, FIG. 4A illustrates the moveable attenuators 302 and 304 positioned such that the slats in the attenuators are between or next to the plurality of light beams. Together, the moveable attenuators 302 and 304 form a plurality of apertures, through which the light passes from the first lens array to the second lens array. With the moveable attenuators 302 and 304 positioned as illustrated in FIG. 4A, the attenuators do not block a significant portion of the light passing from the first lens array to the second lens array. FIG. 4A thus illustrates the multi-aperture dimmer 150 in a bright state configuration.

FIG. 4B illustrates the moveable attenuators 302 and 304 each moved inward to partially close the plurality of apertures. In this position, the moveable attenuators 302 and 304 block a portion of the light passing from the first lens array to the second lens array. This blocking of the light provides dimming to the extent that a portion of the light is no longer transmitted through the fly's eye homogenizer, and thus corresponds to a partially dimmed display. Likewise, FIG. 4C illustrates the moveable attenuators 302 and 304 each moved further inward to further close the plurality of apertures, and thus blocking a greater portion of the light passing from the first lens array to the second lens array. This corresponds to an even larger amount of dimming. Finally, FIG. 4D illustrates the moveable attenuators 302 and 304 each moved further inward to further close the plurality of apertures until almost all the light passing from the first lens array to the second lens array is blocked. This would correspond to a very large amount of dimming.

Thus, the moveable attenuators 302 and 304 can be moved to open and close the plurality of apertures through, which light is transmitted from the first lens array to the second lens array. By selectively controlling the plurality of moveable attenuators 302 and 304, the multi-aperture dimmer 150 can control the amount of light propagating through the fly's eye homogenizer, and thus can control the dimming of the display. Because the moveable attenuators 302 and 304 can be positioned the block substantially no light (e.g., FIG. 4A) and also positioned to block substantially all light (e.g., FIG. 4D), the multi-aperture dimmer 150 can provide a very large range of dimming.

It should be noted that the moveable attenuators 302 and 304 can implemented in any manner that will provide attenuation of light passing through the fly's eye homogenizer. For example, the movable attenuators can be formed from absorbing or reflective material that prevents all visible light from passing through. Examples of suitable materials include anodized metal, metallic or dielectric mirrors, chromium chromium-oxide deposited on a glass substrate, diffusely reflective surfaces, scattering structures, or any other light blocking material capable of handling any heat buildup due to light absorption. In other embodiments, the moveable attenuators can be formed from partial attenuation material that blocks some light but allows some portion of the light to pass through. These partial attenuation materials can be in form of thin metallic films, color or polarization filters, scattering structures or other suitable elements. Finally, as will be described in greater detail below, the moveable attenuators can be formed with a combination of blocking and partial blocking materials.

It should be noted that the moveable attenuators 302 and 304 can be controllably moved with any suitable actuator. For example, simple servo motors, piezoelectric devices, electrostatic actuators, electromagnetic voice coils, stepper motors etc., can all be used to move the moveable attenuators 302 and 304. It should also be noted that one advantage of the implementation illustrated in FIGS. 3–4 is that a relatively simple actuator structure can be used to move the attenuators. This provides for low cost, high reliability, and can help facilitate precise attenuator control and thus precise dimming control.

As stated above, a preferred approach for implementing the moveable attenuators is to aperture all the moveable attenuators simultaneously with a simple drive mechanism. In some cases however, it will be desirable to vary the relative rates and positions at which the multi-apertures close. This could be done by varying the attenuation profiles of each moveable attenuator or constructing the moveable attenuators from multiple components that move with different rates.

Another advantage to this implementation is the ability to provide a very high maximum dimming ratio with excellent control through the use of a small number of positioning actuators, preferably one, with a smooth motion. The approach is also useful when applied to a single light path, providing the capability for extremely high attenuation ratio with a customizable rate of dimming for a given actuator input.

Of course, other embodiments and implementations can use different methods for moving and positioning the moveable attenuators. As one other example, the slats of the attenuators can be configured to rotate and sit parallel to the optical axis when in the bright state. When dimming is required, these moveable attenuator slats can be rotated back toward the plane of the attenuator to block a portion of the light passing through, in a manner similar to the operation of a venetian blind. Such a system would have the advantage of requiring less space between light beams to place the attenuators without blocking light in the bright state. This makes this embodiment more desirable for fly's eye lens array applications that do not have has much spatial distance between light beams at the second lens array, such as those that do not use polarization converter elements. One disadvantage to such a system is the relative complexity of the actuating system that would be required to implement the rotation of individual movable attenuator slats.

It should be noted that while the embodiments of FIGS. 3 and 4 illustrate two moveable attenuators, that the multi-aperture dimming system can be implemented with more or less moveable attenuators, and combinations of moveable and stationary attenuators. It should also be noted that system performance can depend upon other details of the attenuators. To maximize system uniformity as the system is dimmed, it is often desirable to keep the attenuators thin and close together. It may also be beneficial to bevel the leading edges of the slats to maintain angular uniformity of light passing through the apertures.

Figure 5:
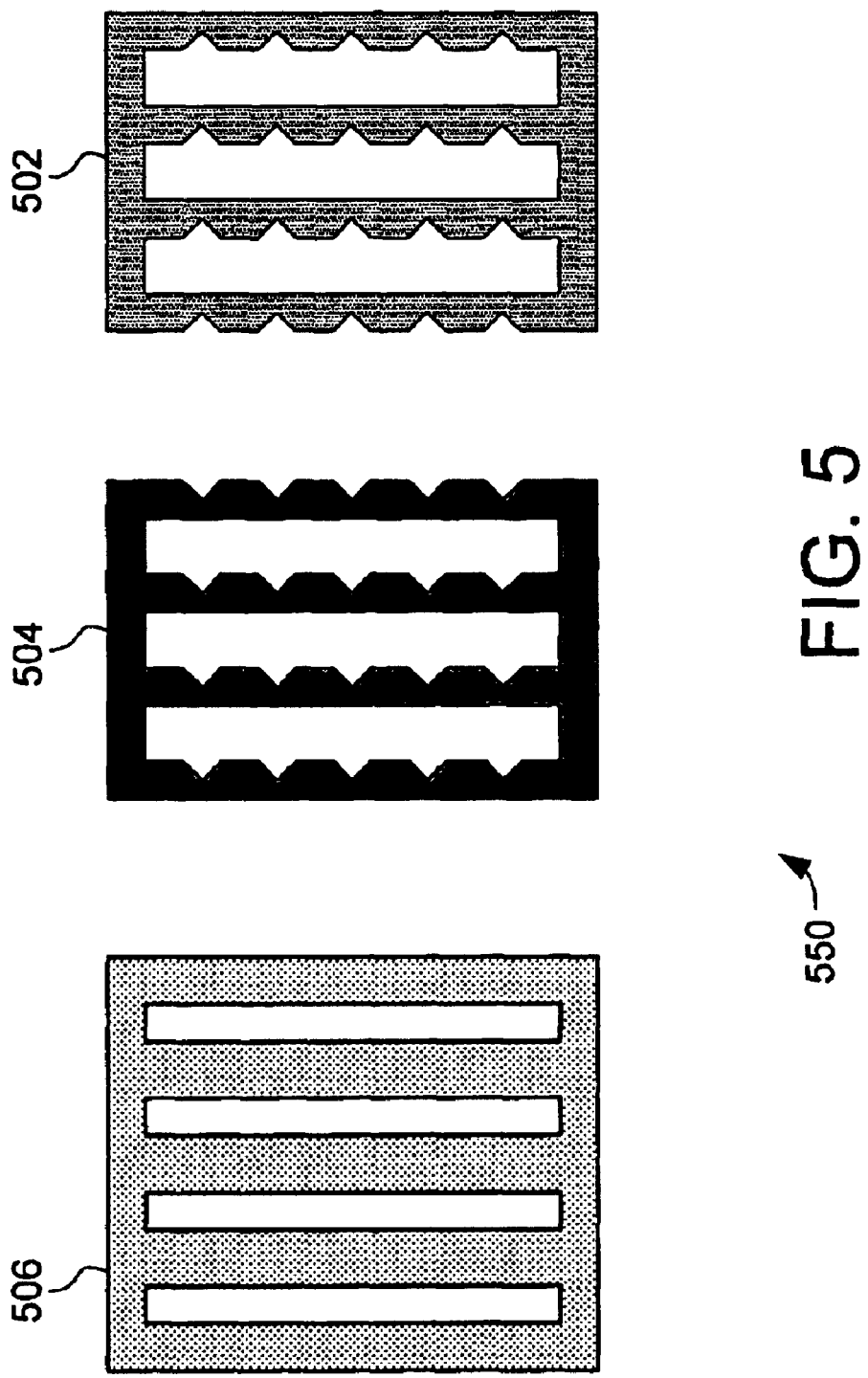
FIG. 5 is a schematic view of a second embodiment dimming device.

Turning now to FIG. 5, a second embodiment of a multi-aperture dimmer 550 is illustrated. The multi-aperture dimmer 550 comprises a first set of moveable attenuators 502 and a second set of moveable attenuators 504. Additionally, the multi-aperture dimmer 550 includes a set of fixed attenuators 506. The attenuators 502, 504 and 506 each comprise several vertical slats. The slats are again configured with a dimension and spacing such that they can positioned between the light beams in the fly's eye homogenizer. This allows the attenuators 502, 504 and 506 to be positioned out of the way of the light beams for full light transmission. When dimming is required, the moveable attenuators 502 and 504 can be moved to partially or completely block the light beams.

In this second embodiment, the fixed attenuator 506 is positioned between the light beams to block any light that would otherwise be passed through that area when the moveable attenuators 502 and 504 are moved inward. Thus, the second embodiment can provide a darker dark state than could typically be provided with only the two moveable attenuators. It should be noted that instead of using a fixed attenuator for this purpose, one or more additional movable attenuators could instead be used to provide the greater dimming. Furthermore, instead of using two moveable attenuators, one moveable attenuator and one fixed attenuator could be used.

In this second embodiment, the moveable attenuators 502 and 504 have an attenuation profile selected to increase dimming control at low light levels. Specifically, the edge of the slats that are moved to block the light beams have an attenuation profile that increases the dimming control by increasing the ratio of moveable attenuator movement to the corresponding change in throughput at low light transmission levels. This increases dimming control by making throughput less sensitive to attenuator movement at these low light levels.

In the example, illustrated in FIG. 5, the moveable attenuators 502 and 504 have an attenuation profile that comprises V-shaped openings at locations that correspond to the light beams passing from the first lens array to the second lens array. The V-shaped attenuation profile provides an opening in the apertures even after the leading edges of the moveable attenuators 502 and 504 have overlapped. As will become clear, this is just one example of a shape that can be used to provide the attenuation profile. As other examples, the attenuation profile can comprise complex curves or other shapes that provide multiple dimming control modes. Additionally, the attenuation profile can include partial attenuation structures such as filters and other devices to create multiple different levels of sensitivity at different levels of dimming.

Figure 6A:
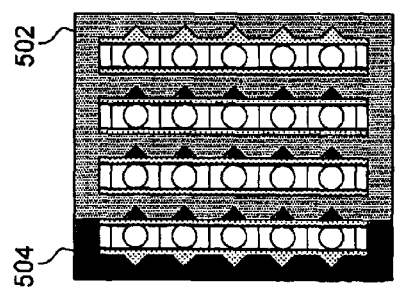
FIG. 6 a schematic view of a second dimming device at various dimming levels.

Turning now to FIGS. 6A, 6B, 6C, 6D, 6E and 6F, the multi-aperture dimmer 550 is illustrated at several different dimming levels. FIGS. 6A–6F illustrate the multi-aperture dimmer 550 adjacent a second lens array, with circles again illustrating the location of the plurality of light beams as formed by the first lens array (as illustrated in FIG. 2). Specifically, FIG. 6A illustrates the moveable attenuators 502 and 504 positioned such that the slats in the attenuators are between or next to plurality of light beams. Together, the moveable attenuators 502 and 504 form a plurality of apertures, through which the light passes from the first lens array to the second lens array. With the moveable attenuators 502 and 504 positioned as illustrated in FIG. 6A, the attenuators do not block a significant portion of the light passing from the first lens array to the second lens array. FIG. 6A thus illustrates the multi-aperture dimmer 550 in a bright state configuration.

Figure 6B:
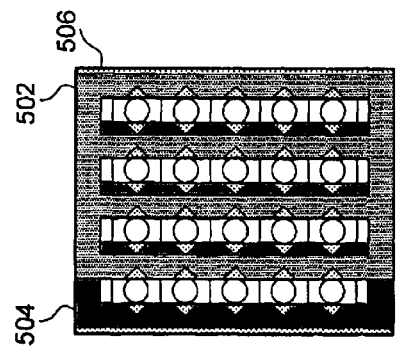
Figure 6C:
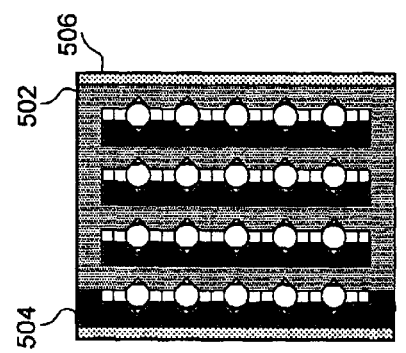
Figure 6D:
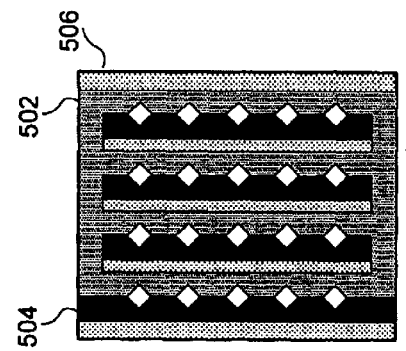
Figure 6E:
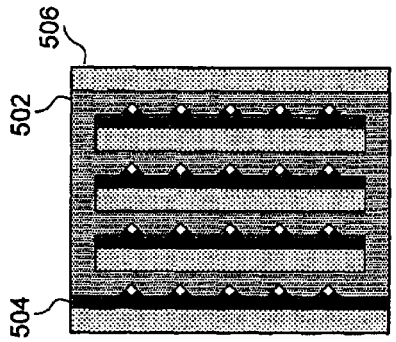
Figure 6F:
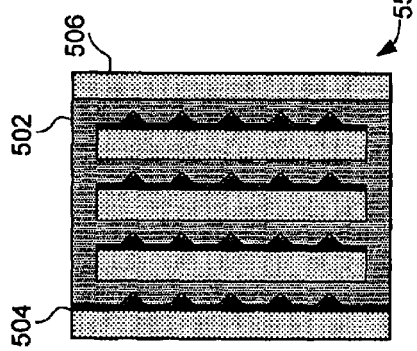

FIG. 6B illustrates the moveable attenuators 502 and 504 each moved inward to partially close the plurality of apertures. In this position, the moveable attenuators 502 and 504 block a small portion of the light passing from the first lens array to the second lens array. This blocking of the light provides dimming to the extent that a portion of the light is no longer transmitted to the projection display, and thus corresponds to a partially dimmed display. Likewise, FIGS. 6C, 6D and 6E each illustrate the moveable attenuators 502 and 504 each moved further inward to further close the plurality of apertures, and thus blocking a greater portion of the light passing from the first lens array to the second lens array. This corresponds to an even larger amount of dimming. Finally, FIG. 6F illustrates the moveable attenuators 502 and 504 each moved further inward to further close the plurality of apertures until almost all the light passing from the first lens array to the second lens array is blocked. This would correspond to a very large amount of dimming.

In this embodiment, the fixed attenuator 506 is positioned between the light beams, and thus serves to continue blocking light that might otherwise pass through that region when the movable attenuators 502 and 504 have moved to block the light beams. Thus, the moveable attenuators 502 and 504 can be moved to open and close the plurality of apertures. By selectively controlling the plurality of moveable attenuators 502 and 504, the multi-aperture dimmer 550 can control the amount of light propagating through the fly's eye homogenizer, and thus can control the dimming of the display. Because the moveable attenuators 602 and 604 can be positioned to block almost no light (e.g., FIG. 6A) and also positioned to block almost all light (e.g., FIG. 6F), the multi-aperture dimmer 550 can provide a very large range of dimming.

Additionally, because the multi-aperture dimmer 550 uses relatively simple attenuator movement, the dimmer can provide relatively precise control over the amount of dimming, even at low light transmission levels. The precise control of dimming at low levels is further enhanced by the attenuation profile on the slats in the moveable attenuators 502 and 504. Specifically, the edge of the slats that are moved to block the light beams have an attenuation profile that increases the dimming control by increasing the ratio of moveable attenuator movement to the corresponding change in throughput at low light transmission levels. This increases dimming control by making throughput less sensitive to attenuator movement at these low light levels. In the example of FIG. 6, the attenuation profile comprises V-shaped openings at locations that correspond to the light beams passing from the first lens array to the second lens array. As the multi-aperture dimmer 550 closes, the V-shaped profiles provide openings that slow the amount of further dimming relative to the movement of the attenuators. Thus, the same amount of attenuator movement results in less change in aperture area (and hence throughput) at low levels. Otherwise, at low levels very small movements in the attenuators would result in large relative changes aperture size. For example, the amount of movement required to go from blocking 99 percent of the light to blocking 99.9 percent of the light would be extremely small if straight edge slats were used. The V-shaped attenuation profile changes this by increasing the amount of attenuator movement required to further reduce throughput at low throughput levels. This makes it easier to provide the precise control over dimming needed at low throughput levels.

This variation in sensitivity to attenuator movement can also be explained mathematically. When the attenuators are first beginning to block light, such as in FIGS. 6B and 6C, the area of the aperture opening varies according to a term which is approximately linearly proportional to the relative separation of the attenuators 502 and 504. As the leading edge changes to the V-shaped profiles, the expression for the area opening changes and is dominated by a term which is proportional to the square of the relative separation of the attenuators. Each of these two cases provides a different ratio of moveable attenuator movement to light transmission throughput change. Each ratio can and will in general be a function of the relative separation parameter, so being different means that the two ratios are best expressed by two differing functional forms. These two responses represent different dimming regions or modes which are traversed sequentially by varying the separation of the attenuators along a single axis. In general, this sequential mode dimmer behavior is best defined by different equations during each of the modes or response regions.

Again, the V-shaped attenuation profile illustrated in FIG. 6 is just one example of a shape that can be used to provide the attenuation profile. As other examples, the attenuation profile can comprise complex curves or other shapes that provide multiple dimming control modes. Additionally, the attenuation profile can include partial attenuation structures such as filters and other devices to create multiple different levels of sensitivity at different levels of dimming.

Figure 7C:
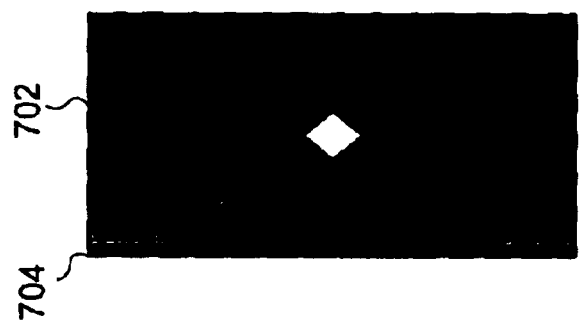
FIGS. 7–9 are a schematic view of different moveable attenuators at various dimming levels.
Figure 7B:
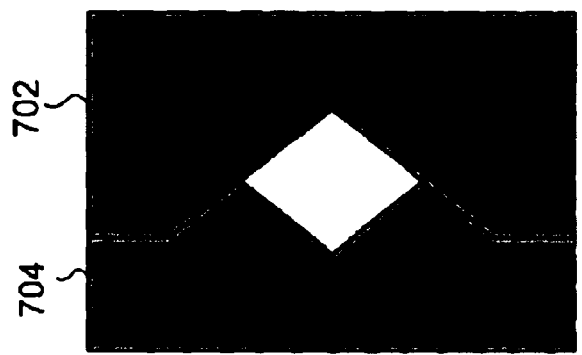
Figure 7A:
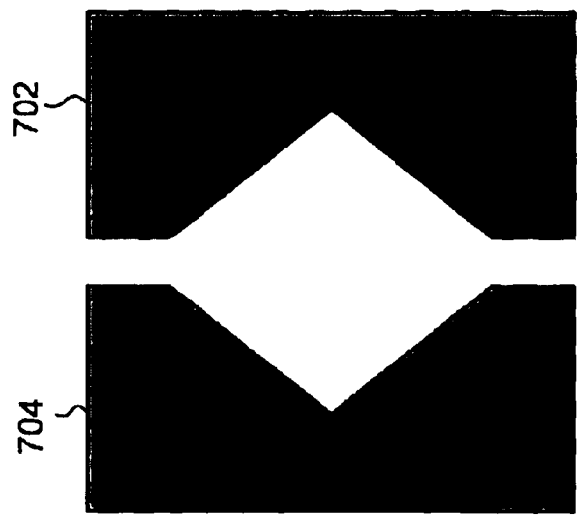

Turning now to FIGS. 7A, 7B, and 7C, movable attenuators with a V-shaped attenuation profile are illustrated. Specifically, FIG. 7A–7C illustrate a portion of a first moveable attenuator 702 and a portion of a second moveable attenuator 704, with a V-shaped attenuation profile similar to that illustrated in FIG. 6. FIGS. 7A–7C illustrate only a portion of the attenuators 702 and 704, and a suitable moveable attenuator would in many cases include more V-shaped attenuation profiles, commonly one per lens in the lens array as was illustrated in the example of FIG. 6. In some embodiments however, the V-shaped attenuation profile could be used in a single-aperture dimmer. The V-shaped attenuation profile provides precise dimming control by increasing the ratio of moveable attenuator movement to the corresponding change in throughput at low light transmission levels. This increases dimming control by making throughput less sensitive to attenuator movement at these low light levels.

As the moveable attenuators 702 and 704 are first moved together, the change in throughput is primarily determined by the change in distance between the attenuators. This condition is illustrated in FIG. 7A. This provides a first "dimming mode", where a dimming mode is defined as a range of attenuator movement over which aperture area varies in a particular manner, and results in a corresponding change in throughput. As the moveable attenuators 702 and 704 begin to overlap, as illustrated in FIG. 7B, the change in throughput is now primarily determined by the shape of the "V" in the attenuation profile. This causes a decreased rate of change in aperture area and throughput, and thus provides a second dimming mode. This second dimming mode requires more attenuator movement to effect a corresponding change in throughput at low light transmission levels. The aperture area of the opening in FIG. 7B would best be defined by a different function of attenuator movement than would be used for the opening of FIG. 7A, providing a sequential mode dimmer. The V-shaped attenuation profile thus gives good control over dimming even as the attenuators begin to fully overlap, as illustrated in FIG. 7C.

Figure 8C:
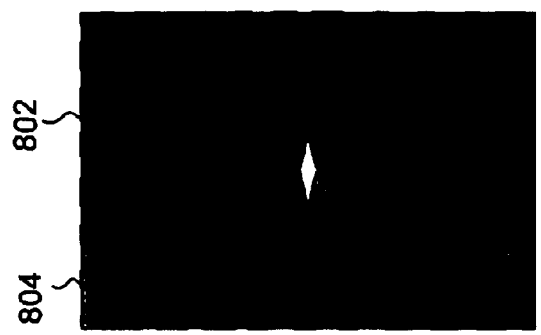
Figure 8B:
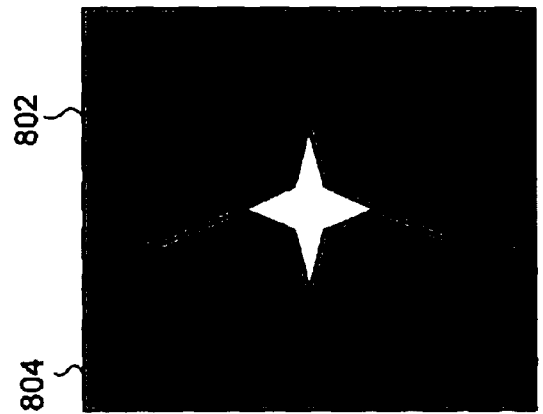
Figure 8A:
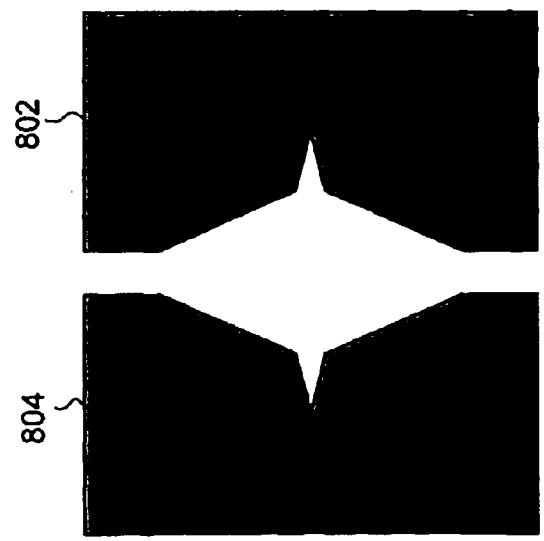

Turning now to FIGS. 8A, 8B, and 8C, movable attenuators with a compound V-shaped attenuation profile are illustrated. Specifically, FIGS. 8A–8C illustrate a portion of a first moveable attenuator 802 and a portion of a second moveable attenuator 804, with a compound V-shaped attenuation profile. FIGS. 8A–8C illustrate only a portion of the attenuators 802 and 804, and a suitable moveable attenuator would in many cases include more compound V-shaped attenuation profiles, commonly one per lens in the lens array as was illustrated in the example of FIG. 6. In some embodiments however, the V-shaped attenuation profile could be used in a single-aperture dimmer. The compound V-shaped attenuation profile provides even more precise dimming control by further increasing the ratio of moveable attenuator movement to the corresponding change in throughput at low light transmission levels. Specifically, the compound V-shaped attenuation profile provides a third dimming mode with even greater dimming control.

As the moveable attenuators 802 and 804 are moved together, the change in aperture area is primarily determined by the change in distance between the attenuators. This condition is illustrated in FIG. 8A. This provides a first "dimming mode", where the dimming mode is again defined as discussed above. As the moveable attenuators 802 and 804 begin to overlap, as illustrated in FIG. 8B, the change in throughput is now primarily determined by the shape of the larger "V" in the attenuation profile. This causes a decreased rate of change in the aperture area and resulting throughput is a second "dimming mode". As the moveable attenuators 802 and 804 overlap such that the smaller "Vs" begins to overlap, the rate of change is again decreased. Thus, FIG. 8C illustrates a third dimming mode that provides even greater control over dimming at low light transmission levels.

Figure 9C:
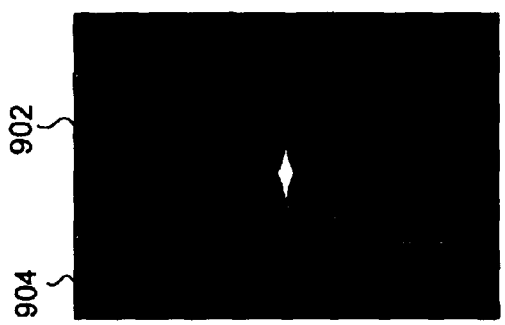
Figure 9B:
Figure 9A:
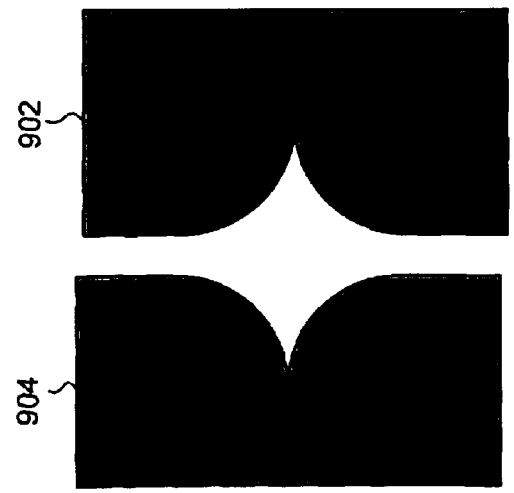

Turning now to FIGS. 9A, 9B, and 9C, movable attenuators with a curved shape attenuation profile are illustrated. Specifically, FIGS. 9A–9C illustrates a portion of a first moveable attenuator 902 and a portion of a second moveable attenuator 904, with a curved shape attenuation profile. FIGS. 9A–9C illustrate only a portion of the attenuators 902 and a suitable moveable attenuator would in many cases include more curved shape attenuation profiles, commonly one per lens in the lens array as was illustrated in the example of FIG. 6. In some embodiments however, the V-shaped attenuation profile could be used in a single-aperture dimmer. The curved shape attenuation profile provides the ability to tailor the dimming control to specific requirements.

As the moveable attenuators 902 and 904 are moved together, the change in dimming is primarily determined by the change in distance between the attenuators. This condition is illustrated in FIG. 9A. This again provides a first "dimming mode". As the moveable attenuators 902 and 904 begin to overlap, as illustrated in FIG. 9B, the change aperture area is now primarily determined by the shape of the curved shape in the attenuation profile. This again causes a decreased rate of change in throughput relative to attenuator movement. Because the attenuation profile is curved, a continuous change in the dimming response occurs as the moveable attenuators 802 and 804 are moved to overlap each other. Thus, the curved shape attenuation profile provides continuously increased control of aperture area and resulting throughput as the attenuators are moved to overlap in greater amounts. The range of apertures over which the slats are overlapping, in FIGS. 9B–9C, is described by a different function than in 9A, however, so FIGS. 9A–9C still represent a sequential mode dimmer.

Figure 10:
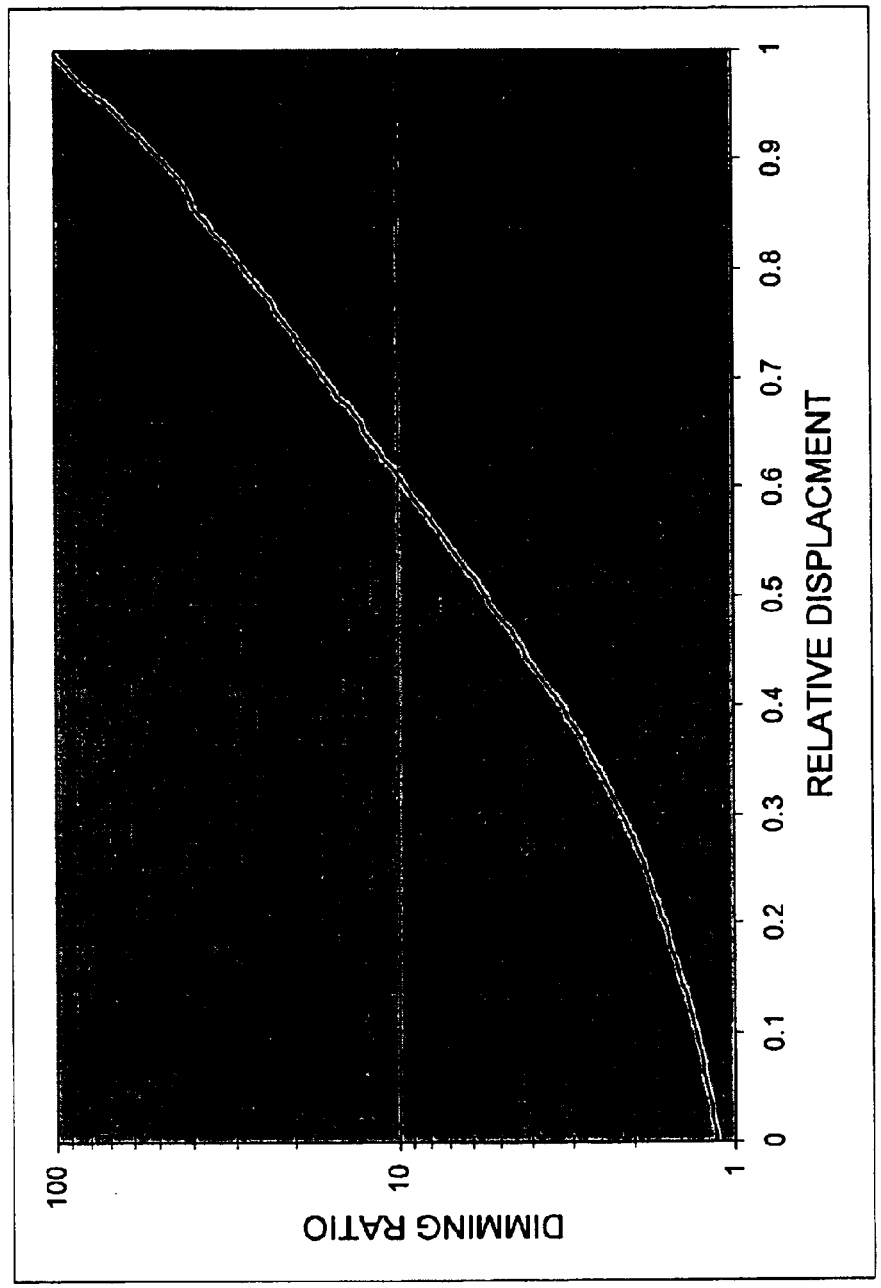
FIG. 10 is a graph of dimming ratio as a function of relative displacement.

Turning now to FIG. 10, a graph 1000 illustrates the dimming ratio as a function of the relative displacement for a particular curved shape attenuation profile. Graph 1000 illustrates how one can obtain a log-linear dimming profile response which is straight for a significant range of displacements. This can be compared to the curve one would obtain with simple Vs, which would not have a significant region of straight log-linear response. The straight log-linear response region makes it relatively easy to control the throughput at the dim levels, since relative percentage changes in the throughput require comparable levels of movement. It should be noted that the graph 1000 illustrates just one implementation of a curved attenuation profile, and that different shapes and structures could be used to attain different results.

In addition to adjusting the edge shape of the moveable attenuators, the attenuation profile can also be modified through the use of one or more partial attenuator structures. These partial attenuator structures allow a portion of the light to pass through, while blocking or absorbing the other portions. Examples of partial attenuator structures include filters, such as neutral density filters that filter all colors equally and scattering, polarizing or color filters. Other partial attenuator structures include patterned structures, formed from bulk materials or lithographically etched. In all these cases, the addition of the partial attenuator structure can be used to further modify the attenuation profile of the movable attenuators. This provides for further control of the dimming modes and low light transmission dimming control.

Turning now to FIGS. 11A, 11B, 11C, 11D and 11E, movable attenuators with a partial attenuator structure are illustrated. Specifically, FIGS. 11A–11E illustrate a portion of a first moveable attenuator 1102 and a portion of a second moveable attenuator 1104. The first portion of the moveable attenuator 1102 and the second portion of the moveable attenuator 1104 both include partial attenuator structures 1106.

Again, FIGS. 11A–11E illustrate only a portion of the attenuators 1102 and 1104, and a suitable moveable attenuator would in many cases include more attenuation profiles with partial attenuator structures 1106, commonly one per lens in the lens array as was illustrated in the example of FIG. 6. In some embodiments however, the attenuation profile with a partial attenuator structure could be used in a single-aperture dimmer.

The partial attenuator structure 1106 provides precise dimming control by increasing the ratio of moveable attenuator movement to the corresponding change in throughput at low light transmission levels. This increase dimming control by making dimming less sensitive to attenuator movement at these low light levels.

As the moveable attenuators 1102 and 1104 are first moved together, the change in dimming is primarily determined by the change in distance between the attenuators. This condition is illustrated in FIG. 11A. This again provides a first "dimming mode". As the moveable attenuators 1102 and 1104 begin to overlap, as illustrated in FIG. 11B, the change in dimming is now primarily determined by the shape of the "V" in the attenuation profile. This causes a decreased rate of change that is a second dimming mode.

Additionally, some change in dimming is caused by the fact that portions of the partial attenuator structures 1106 are now overlapping. The effect of this overlap will depend upon the type of partial attenuator structure. For example, in a neutral density filter, the overlap causes a logarithmic increase in the amount of filtering. For example, if ND1 filters (that allow ten percent of light to pass) are used the overlapping area would effectively be filtered as an ND2 filter (allowing only one percent of light to pass). In any case, the overlapping of the partial attenuator structure further changes the dimming of the moveable attenuators 1102 and 1104.

As the moveable attenuators 1102 and 1104 are moved further together, the aperture will eventually be completely filled by the partial attenuator structure, as illustrated in FIG. 11C. Additionally a significant portion 1110 of the aperture is filled with overlapping filters. This provides changes in throughput at a second level and thus an additional dimming mode. As the moveable attenuators 1102 and 1104 are moved further together, a still greater portion 1112 of the aperture is filled with overlapping partial attenuator structures, as illustrated in FIG. 11D. This provides area modulation at a third level and thus an additional dimming mode.

Finally, as the movable attenuators 1102 and 1104 are moved together the entire aperture is filled with overlapping partial attenuator structures, as illustrated in FIG. 11E. This provides yet another area modulation and an additional dimming mode. As an example, if the partial attenuator structures comprise ND2 filters, with two overlapping filters providing the equivalent of an ND4 filter, the light passing through the display will be less then one ten thousandth of its original brightness. Thus, the addition of partial attenuator structures to the attenuation profile of the moveable attenuators can be used to greatly increase the control over dimming at low brightness levels.

Figure 12:
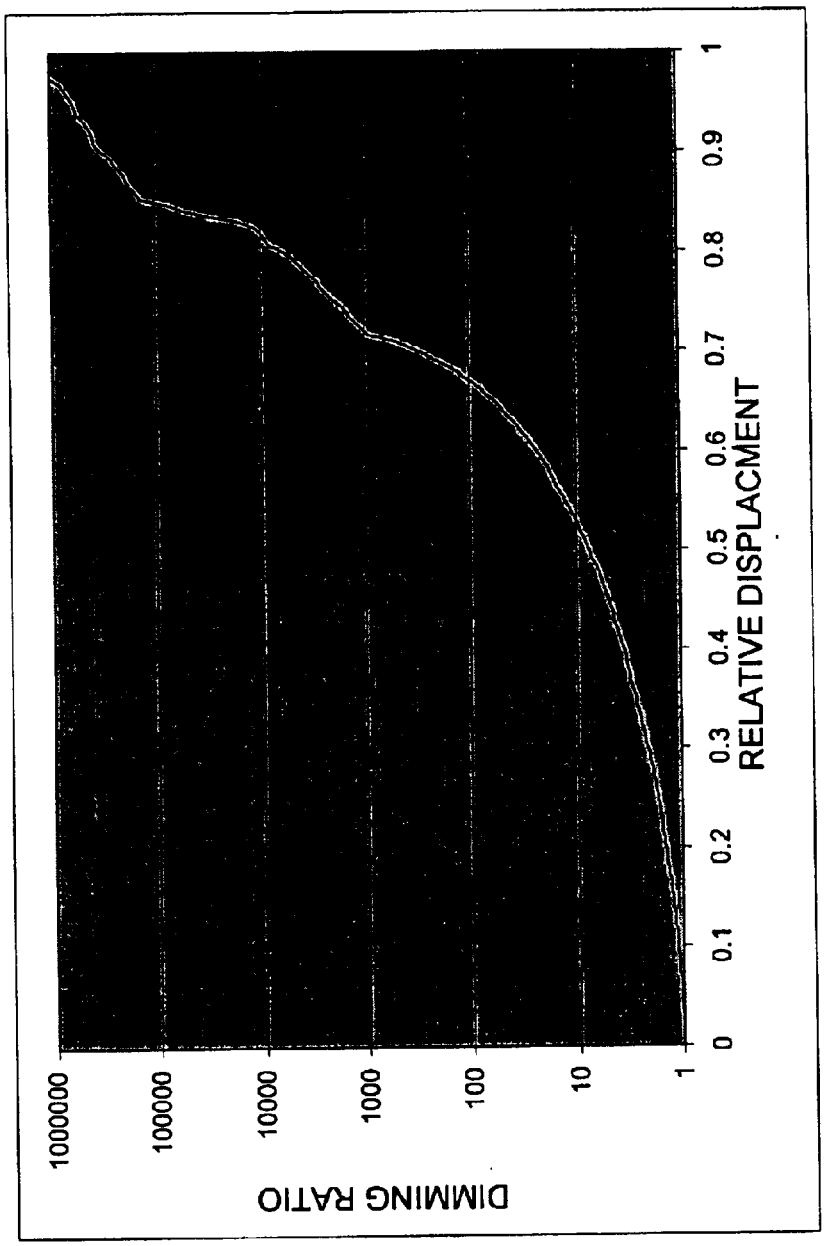
FIG. 12 is a graph of dimming ratio as a function of relative displacement.

Turning now to FIG. 12, a graph 1200 illustrates the dimming ratio as a function of the relative displacement for attenuation profile with a partial attenuator structure as illustrated in FIG. 11. Graph 1200 illustrates how the dimming profile has several distinct regions. There are two inflection points visible in the curve. The slope of the curve is decreased after each inflection point. This increases the displacement needed to obtain the same change in dimming compared to a simple dimmer. By increasing the displacement, one decreases the sensitivity of the dimmer to positional noise It should be noted that the graph 1200 illustrates just one implementation of an attenuation profile with a partial attenuation structure, and that different shapes types of partial attenuation structures attain different results.

Figure 13:
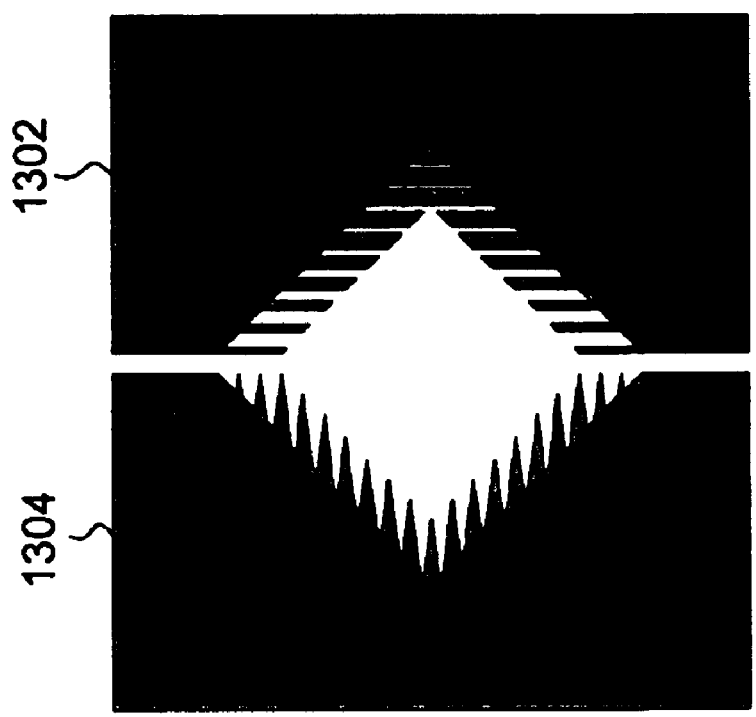
FIG. 13 is a schematic view of another embodiment moveable attenuators.

Turning now to FIG. 13, a second embodiment of movable attenuators with a partial attenuator structure are illustrated. Specifically, FIG. 13 illustrates a portion of a first moveable attenuator 1302 and a portion of a second moveable attenuator 1304. The first portion of the moveable attenuator 1302 and the second portion of the moveable attenuator 1304 both include partial attenuator structures that comprise a halftone pattern filter. Again, FIG. 13 illustrates only a portion of the attenuators 1302 and 1304, and a suitable moveable attenuator would in many cases include more attenuation profiles with halftone pattern filters, commonly one per lens in the lens array as was illustrated in the example of FIG. 6. In some embodiments however, the attenuation profile with a halftone pattern filter partial attenuator structure could be used in a single-aperture dimmer.

Any type of halftone or dot filter could be used as a partial attenuator structure. Normal halftone patterns can be used, but it is also generally preferable to avoid Moiré patterns that could be created as the two patterns overlap. Such a Moiré pattern could create periodic fluctuations in brightness. One way to avoid this problem is to create filter patterns that have significantly different frequency components. A frequency component is a characteristic of the variation of a pattern which includes both the frequency of variation and the orientation along which that variation occurs. Different frequency components means that the filter patterns have either different frequencies or different orientations, or both. This is clearly the case with the embodiment of FIG. 13, where the halftone patterns have orthogonal orientations. The apparatus shown in FIG. 13 also includes slowly varying change in the duty cycle of the patterns, further adding to the degree of dimming control The halftone patterns can be created using any suitable process. Examples include photolithographic pattering of a metal film such as aluminum on a transparent substrate. In some embodiments, antireflection coatings could be added to minimize insertion loss.

It should also be noted that a filter could be created that has a desired spectral weighting. With this it would be possible to gradually change the spectral content as the system is dimmed.

It should be noted that many variations of the above embodiments can be used to provide a desired attenuation profile. For example, it can be desirable to combine a complex edge shape or partial attenuation structure on one movable attenuator and a simple straight edge on the other. Such a system would provide increased control, with the advantage of relative simplicity. Another example is when one moveable attenuator is reflective and other is absorbing. This would suppress multiple reflections between overlapped filters. An alternative method to suppress reflections is to add an absorbing layer between two reflective elements.

In another embodiment of the present invention, the dimming system comprises at least one moveable attenuator, with the attenuator movable to open and close an aperture and control the amount of light transmitted through the aperture. The moveable attenuator includes an attenuation profile selected to increase the control over the dimming system at low light transmission levels. The attenuation profile increases the dimming control by increasing the ratio of moveable attenuator movement to the corresponding change in throughput at low light transmission levels. This can be accomplished through the use of partial attenuator structures (e.g., filters) as discussed above, or with complex edge shapes such as the compound-V discussed above. These complex shapes and/or partial attenuator structures can provide multiple dimming modes, where the dimming modes are again regions of moveable attenuator movement where the ratio of moveable attenuator movement to light transmission throughput change follow different behaviors. These multiple dimming modes can be configured to decrease light transmission throughput change relative to movement of the moveable attenuator as the aperture is moved from open to closed.

The present invention thus provides a dimming system that facilitates a wide dimming range and precise control of the dimming range. In one embodiment, the dimming system comprises a multi-aperture dimming system. The multi-aperture dimming system can be implemented in any display that utilizes a fly's eye lens array. The multi-aperture dimming system comprises a plurality of moveable attenuators. The moveable attenuators are configured to form a plurality of apertures that can be controllably opened and closed. Each of the plurality of apertures attenuates a portion of the light propagating through at least one of the lenses in the fly's eye lens array. Thus, by selectively controlling the plurality of moveable attenuators, the dimming system can control the throughput of light propagating through the fly's eye lens array, where the throughput is the percentage of light passed compared to the light passed at maximum brightness and thus is the reciprocal of the dimming ratio at a given setting The moveable attenuators are preferably configured to allow substantially all light transmission through each lens in the fly's eye lens array when the moveable attenuators are moved to open the plurality of apertures. Likewise, the plurality of moveable attenuators are preferably configured to block substantially all light through each lens in the fly's eye lens array when moved to close the plurality of apertures. Thus, the dimming system can provide a large maximum dimming ratio.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A dimming device in a display that utilizes a fly's eye lens array that comprises an array of lenses, the dimming device comprising:
   at least one moveable attenuator, the at least one moveable attenuator configured to form a plurality of apertures that can be controllably opened and closed, each of the plurality of apertures corresponding to at least one lens of the array of lenses in the fly's eye lens array to selectively attenuate light transmission through the at least one lens, and wherein the at least one moveable attenuator is configured to block substantially all light through the fly's eye lens array when the at least one moveable attenuator is moved to close all of the plurality of apertures.

2. The dimming device of claim 1 wherein the at least one moveable attenuator comprises a plurality of slats.

3. The dimming device of claim 1 wherein the at least one moveable attenuator comprises a plurality of slats, and wherein the plurality of slats are positioned between lenses in the array of lenses when the dimmer is in a bright state and wherein they are movable to block light in the dark state.

4. The dimming device of claim 1 where at least one moveable attenuator comprises a first moveable attenuator and a second moveable attenuator.

5. The dimming device of claim 4 wherein the first moveable attenuator and the second moveable attenuator are configured to move in opposite directions to close the plurality of apertures.

6. The dimming device of claim 1 wherein the at least one moveable attenuators comprise an attenuation profile that determines a ratio of attenuator movement to change in a light throughput.

7. The dimming device of claim 6 wherein the attenuation profile is determined at least in part by a plurality of shapes in the at least one moveable attenuator.

8. The dimming device of claim 7 wherein the plurality of shapes comprises one shape for each lens in the array of lenses.

9. The dimming device of claim 7 wherein the plurality of shapes comprises V-shapes.

10. The dimming device of claim 7 wherein the plurality of shapes comprises curved shapes.

11. The dimming device of claim 7 wherein the plurality of shapes comprises compound V-shapes.

12. The dimming device of claim 6 wherein the attenuation profile is determined at least in part by a plurality of partial attenuator structure in the at least one moveable attenuator.

13. The dimming device of claim 12 wherein the plurality of attenuator structures comprises a plurality of filters.

14. The dimming device of claim 13 wherein the plurality of filters comprises a plurality of neutral density filters.

15. The dimming device of claim 13 wherein the plurality of filters comprises a plurality of halftone patterns.

16. The dimming device of claim 15 wherein the plurality of halftone patterns comprise a pattern having different frequency components than a halftone pattern on a second attenuator.

17. A dimming device in a display that utilizes a fly's eye homogenizer that comprises a first array of lenses and a second array of lenses, the first array of lenses focusing a plurality of light beams on the second array of lenses, the dimming device comprising:
   a first attenuator positioned proximate the first array of lenses and the second array of lenses, the first attenuator comprising a first plurality of slats, the first plurality of slats positioned between light beams in the plurality of light beams;
   a second attenuator positioned proximate the first array of lenses and the second array of lenses, the second attenuator comprising a second plurality of slats, the second plurality of slats positioned between light beams in the plurality of light beams, wherein the first attenuator and the second attenuator form a plurality of apertures, and wherein the second attenuator is movable such that the second plurality of slats is moveable to close the plurality of apertures and selectively block at least a portion of the plurality of light beams to selectively attenuate light transmission through the at least one lens, and wherein the first attenuator and the second attenuator blocks substantially all light through the fly's eye homogenizer when the second attenuator is moved to close all of the plurality of apertures.

18. The dimming device of claim 17 wherein the first attenuator is moveable such that the first plurality of slats is moveable to close the plurality of apertures.

19. The dimming device of claim 17 wherein the second plurality of slats has an attenuation profile that determines a ratio of attenuator movement to change in light throughput.

20. The dimming device of claim 19 wherein the attenuation profile is determined at least in part by a plurality of shapes in the second plurality of slats.

21. The dimming device of claim 20 wherein the plurality of shapes comprise V-shapes.

22. The dimming device of claim 20 wherein the plurality of shapes comprise compound V-shapes.

23. The dimming device of claim 20 wherein the plurality of shapes comprises curved shapes.

24. The dimming device of claim 20 wherein the plurality of shapes comprise at least one shape for each of the lenses in the second lens array.

25. The dimming device of claim 19 wherein the attenuation profile is determined at least in part by a plurality of partial attenuator structures in the second plurality of slats.

26. The dimming device of claim 25 wherein the plurality of partial attenuator structures comprises neutral density filters.

27. The dimming device of claim 25 wherein the plurality of partial attenuator structures comprises halftone patterns.

28. The dimming device of claim 27 wherein the halftone patterns comprise a pattern having different frequency components than a halftone pattern on the first plurality of slats.

29. The dimming device of claim 19 wherein the attenuation profile is determined at least in part by a plurality of in the second plurality of slats and a plurality of partial attenuator slats adjacent the plurality of shapes in the second plurality of slats.

30. A dimming device in a display, the dimming device comprising:

a moveable attenuator, the moveable attenuator controllable to open and close an aperture to selectively vary light transmission throughput through the display, the moveable attenuator including at least one compound V-shape edge, the at least one compound V-shape edge configured to provide a first dimming mode and a second dimming mode, where the first dimming mode provides a first ratio of moveable attenuator movement to light transmission throughput change and wherein the second dimming mode provides a second ratio of moveable attenuator movement to light transmission throughput change.

31. The dimming device of claim 30 wherein the moveable attenuator further comprises at least one partial attenuator structure.

32. A dimming device in a display, the dimming device comprising:

a moveable attenuator, the moveable attenuator controllable to open and close an aperture to selectively vary light transmission throughput through the display, the moveable attenuator including at least one partial attenuator structure configured to decrease light transmission throughput change relative to movement of the moveable attenuator as the aperture is moved from open to closed.

33. The dimming device of claim 32 wherein the partial attenuator structure comprises neutral density filters.

34. The dimming device of claim 32 wherein the partial attenuator comprises halftone patterns.

35. The dimming device of claim 34 wherein the halftone patterns comprise patterns having different frequency components.

* * * * *